C. SCHREIBER.
ELLIPSOGRAPH.
APPLICATION FILED SEPT. 23, 1910.

1,029,515.

Patented June 11, 1912.

Witnesses:
Ephraim Banning.
Wm P Bond

Inventor:
Carl Schreiber.
By Banning & Banning
Attorneys.

COLUMBIA PLANOGRAPH CO., WASHINGTON, D. C.

UNITED STATES PATENT OFFICE.

CARL SCHREIBER, OF CHICAGO, ILLINOIS.

ELLIPSOGRAPH.

1,029,515.  Specification of Letters Patent.  Patented June 11, 1912.

Application filed September 23, 1910. Serial No. 583,406.

*To all whom it may concern:*

Be it known that I, CARL SCHREIBER, a citizen of the United States, residing at Chicago, in the county of Cook and State of Illinois, have invented certain new and useful Improvements in Ellipsographs, of which the following is a specification.

The device of the present invention relates to an instrument used by draftsmen, architects, sign painters, etc., for making oval or elliptical design.

The objects of the present invention are, to construct a device for performing the above mentioned work which will be cheap of construction and simple of operation, having no complicated parts or intricate adjusting mechanism to manipulate; to provide means whereby the instrument is rigidly and firmly supported and maintained in position during operation; to provide means for adjusting the instrument, whereby a small sized ellipse may be accurately produced; and to provide a means for adjustment which will enable a true circle to be struck by the instrument.

A further object of the invention is to provide a member which will serve to locate the center of the ellipse when the device is positioned ready for operation, which member serves to guide the operator when the adjustment of the instrument is made to obtain a small or large ellipse. And a further object of the invention is to provide the instrument with a scale which will determine the difference in length of the semi-major and semi-minor axes.

Further objects of the invention will appear from a detailed description of parts hereinafter set forth and described.

Figure 1:
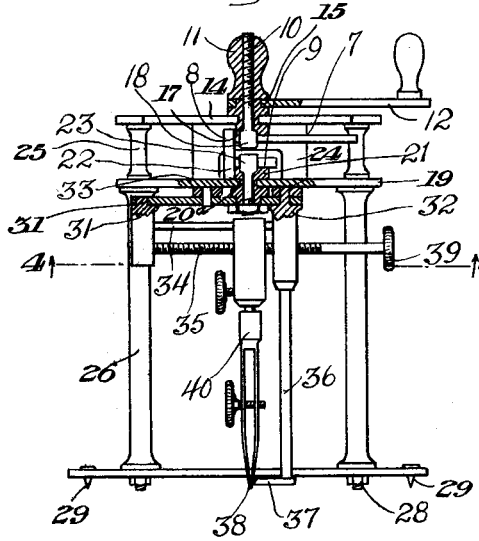
Figure 2:
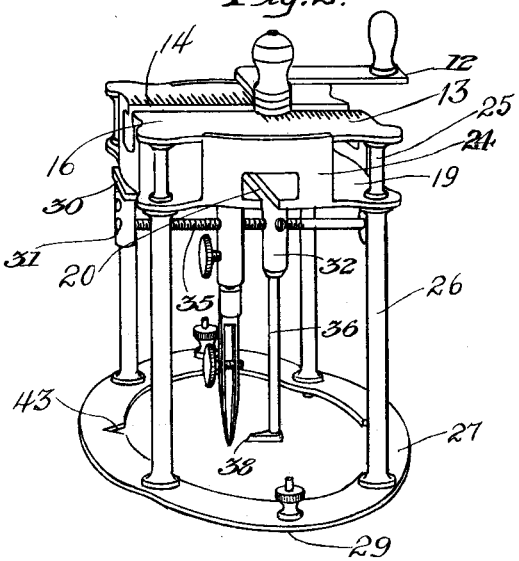
Figures 5, 6:
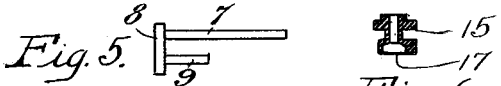
Figure 3:
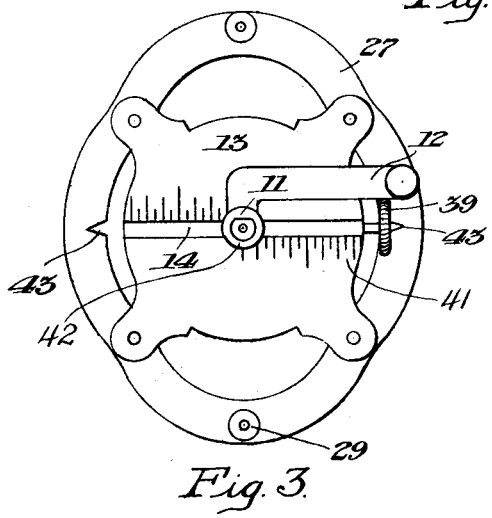
Figure 4:
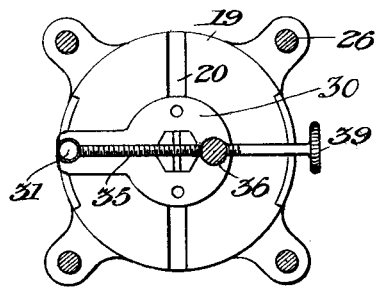

In the drawings, Figure 1 is an elevation, partly in section, of the device of the present invention; Fig. 2, a perspective of the assembled device; Fig. 3, a plan view of the parts shown in Figs. 1 and 2; Fig. 4, a section on line 4—4 of Fig. 1 looking in the direction of the arrow, with the drafting instrument removed; Fig. 5, a side elevation of the connection between the upper and lower rollers; and Fig. 6, a sectional elevation of the roller connecting the operating mechanism with the mechanism carrying the drafting instrument.

The mechanism for moving the drafting instrument in an elliptical path is of the general type shown and described in Letters Patent No. 905,107, issued to me November 24, 1908, but briefly consists of a rod 7 which is journaled within an ear 8, which ear is disconnected and free to move, and a rod 9 also journaled within the ear 8; the rod 7 is secured to a screw-threaded stem 10 extending upwardly and at right angles therefrom and the stem 10 has secured to its upper end a knob 11, said knob, as shown in Fig. 1, serving to clamp and maintain in position an actuating member 12. The rods 7 and 9 lie within a housing 13 which is provided with a slot 14 extending transversely across the upper face thereof, and moving within said slot is a double flanged roller 15 shown more particularly in Fig. 6. The upper flange of said roller travels upon the upper face of the metal, lying on the sides of the slot 14, and the lower portion of the roller is recessed as at 17 to receive an enlargement 18 on the lower end of the stem 10 which serves as a mounting and bearing for the rod 7. The lower plate 19 of the housing 13 is provided with a slot 20, which, as shown more clearly in Fig. 2, extends at right angles to the slot 14, in which slot 20 travels the reduced shank $20^a$ of the roller 21, said roller being mounted upon a stem 22 which terminates in an enlargement 23 upon the upper end thereof, which serves as a bearing for the rod 9. As the handle 12 is rotated, it swings the arms 7 and 9 to cause the various rollers to travel within their respective slots, and imparts to the drafting instrument a motion which carries it through an elliptical path of travel. The principle involved in this operation, however, is fully set forth in the Letters Patent, above referred to, granted to me, and a detailed description of this principle of operation is not deemed necessary at this time.

The upper and lower plates of the housing are connected together by walls 24 and posts 25, as more clearly shown in Fig. 2, and depending downward from the plate 19 and in alinement with the posts 25 are supporting legs or standards 26 which have their lower ends entered into a rail or plate 27 which, as shown, is approximately elliptical in form, and are held in place with respect to said plate by nuts 28 or other suitable devices secured to the lower end thereof. The lower rail 27 acts in conjunction with the housing to give rigidity and strength to the structure whereby vibration of the instrument during the operation of the device is eliminated. The lower rail is further provided with suitable pins 29 which serve to hold the device in place on the paper, and the pins are so arranged that they will register with a line passing through the major axis of the ellipse, and the marks produced by the entering of the pin into the paper serve in part to guide the operator so that if a repositioning of the instrument is necessary it can be placed in the same position as it originally occupied; this, however, will be more fully explained hereinafter.

Attached to the roller 21 is a plate 30 which is secured to said roller in a manner whereby a rotary movement of the plate about the roller is prevented. This can be done by using a hexagonal headed screw, as shown in Fig. 4, which enters a hexagonal recess not shown in the plate or in any other manner well known to the ordinary mechanic.

The plate 30 is provided with depending lugs 31 and 32 arranged at opposite ends thereof. A tilting movement of the plate with respect to the floor 19 of the housing is prevented by interposing a ring 33 in the space between the lower face of the floor and the upper face of the plate, the lug 31 serving as a mounting for one end of a horizontally extending guide rod 34 and for one end of a horizontally extending screw-threaded stem 35. A lug 32 serves as a mounting for the opposite ends of said rod 34 and stem 35, and said lug 32 further serves as a mounting for a member 36 which is equipped with a finger or pointer 37, the outer edge 38 of which always travels in a line coinciding with a line extending through the major axis of the ellipse. Since this point marking the outer edge 38 does not travel in an elliptical path, it serves as a point for guiding the operator in adjusting the instrument to obtain a variance in the size of the minor axis.

Mounted upon the stem 35 and the rod 34 is a drafting instrument 40, of any suitable and well-known type, which instrument lies entirely free from the floor of the housing 13, and is adjusted with respect to the point 38 by turning the screw 35, such manipulation moving the acting end of the drafting instrument a greater or less distance, as desired, from the point 38, whereby the travel of the acting end of the instrument is farther from or nearer to said point, thus producing an ellipse having a greater or less minor axis, as desired.

As shown in Fig. 3, the metal on either side of the slot 14 is marked to provide a scale 41. This scale serves to determine the horizontal displacement of the knob 11 from the center of the instrument, the adjustment of the parts being produced by moving the roller 15 in the slot 14, until the proper point on the scale 41 is in line with the center point 42 of the knob 11.

By forming the parts so that the instrument lies inside of the frame-work, in the manner shown and described, the point of the instrument may be moved close to the center of the machine, and an ellipse of very small dimensions produced, and by using the frame-work, a firm support is given to the instrument at all times, which materially assists in describing ellipses of small proportions. This is considered to be an important point in this device, inasmuch as with all other instruments of this nature with which I am acquainted, it has been impossible to strike an ellipse of small dimensions with any degree of accuracy.

As shown more particularly in Figs. 2 and 3, the lower rail is provided with oppositely disposed notches 43 which serve to register with the minor axis of the ellipse, so that by means of the pins 39 and the notches 43 the instrument may be placed in proper position, and the marks produced by the insertion of the pin into the paper or other material upon which the ellipse is being traced will serve to guide the operator so that a repositioning of the device may be obtained if necessary. The structure upon which the device is mounted is extremely rigid whereby during the movement of the drafting instrument no vibration is imparted thereto which would, of course, be objectionable in that it would tend to deflect the acting end of the instrument from its proper path of travel, and cause it to describe an imperfect ellipse.

I claim:

1. In an ellipsograph, the combination of mechanism for moving an instrument in an elliptical path, a housing inclosing said mechanism and forming the top piece of the instrument, a plurality of fixed supporting legs directly connected to said housing, a plate below the housing operatively connected to the instrument actuating mechanism, a lug secured upon each end of the plate, a threaded member mounted in said lugs and forming the sole support and adjusting means for said instrument, substantially as described.

2. In an ellipsograph, the combination of mechanism for moving an instrument in an elliptical path, a housing inclosing said mechanism, a plurality of fixed supporting legs depending from said housing, a plate below the housing operatively connected to the instrument actuating mechanism, a connection between the plate and instrument, means for adjusting the instrument to change the length of the minor axis, and a member carried by the plate traveling in a path along the major axis, and serving as an indicator in adjusting the instrument to vary the length of the minor axis, substantially as described.

3. In an ellipsograph, the combination of mechanism for moving an instrument in an elliptical path, a plate operatively connected to said mechanism, a lug secured upon each end of the plate, a screw-threaded stem upon which the instrument is mounted, having a bearing in each of said lugs, said stem serving as a means for adjusting the instrument to vary the length of the minor axis, and one of said lugs serving as a mounting for a member traveling along the major axis, and serving as an indicator in adjusting the instrument to vary the length of the minor axis, substantially as described.

4. In an ellipsograph, the combination of mechanism for moving an instrument in an elliptical path, a plate operatively connected to said mechanism, a lug secured upon each end of the plate, a screw-threaded stem having a bearing in each of said lugs, and serving as a means for adjusting the instrument to change the length of the minor axis, and a guide rod mounted in the lugs and coöperating with the threaded stem to serve as a mounting for the instrument, substantially as described.

CARL SCHREIBER.

Witnesses:
WM. P. BOND,
MARY R. FROST.

Copies of this patent may be obtained for five cents each, by addressing the "Commissioner of Patents, Washington, D. C."